United States Patent [19]

Kreutzer

[11] 4,214,186
[45] Jul. 22, 1980

[54] CIRCUIT FOR TRANSISTOR BALLASTS FOR THE GENTLE IGNITION OF FLUORESCENT LAMPS

[76] Inventor: Peter K. Kreutzer, Bettengasse 20, D-7750 Konstanz, Fed. Rep. of Germany

[21] Appl. No.: 965,193

[22] Filed: Nov. 30, 1978

[30] Foreign Application Priority Data

Feb. 25, 1978 [DE] Fed. Rep. of Germany ....... 2808261

[51] Int. Cl.² ................... H05B 41/14; H05B 41/26
[52] U.S. Cl. ............................... 315/102; 315/104; 315/278
[58] Field of Search ............... 315/94, 101, 102, 104, 315/105, 205, 278, 360, DIG. 5

[56] References Cited

U.S. PATENT DOCUMENTS

| | | | |
|---|---|---|---|
| 3,599,051 | 8/1971 | Lee | 315/102 X |
| 3,866,087 | 2/1975 | Powell | 315/104 X |
| 3,975,660 | 8/1976 | Knobel et al. | 315/102 |

FOREIGN PATENT DOCUMENTS

| | | | |
|---|---|---|---|
| 1142417 | 1/1963 | Fed. Rep. of Germany | 315/102 |
| 2721253 | 11/1978 | Fed. Rep. of Germany | 315/102 |

*Primary Examiner*—Eugene R. LaRoche
*Attorney, Agent, or Firm*—Darby & Darby

[57] ABSTRACT

A ballast circuit for controlling the ignition characteristics of a preheat type fluorescent lamp of the type having a transformer with a primary, operating secondary, filament and auxiliary ignition windings, in which there is provided a rectifier having A.C. input terminals, one connected to an end of the operating winding and the other connected to an end of the auxiliary ignition winding by a resistor, and a pair of D.C. output terminals across which is connected a resistive ballast. A starting capacitor is connected to the junction of the resistor and the rectifier A.C. input terminal and applies the auxiliary starting voltage after a time delay. A second capacitor, connected in the lamp running circuit, is charged through a resistor and diode and makes an additional voltage available.

7 Claims, 1 Drawing Figure

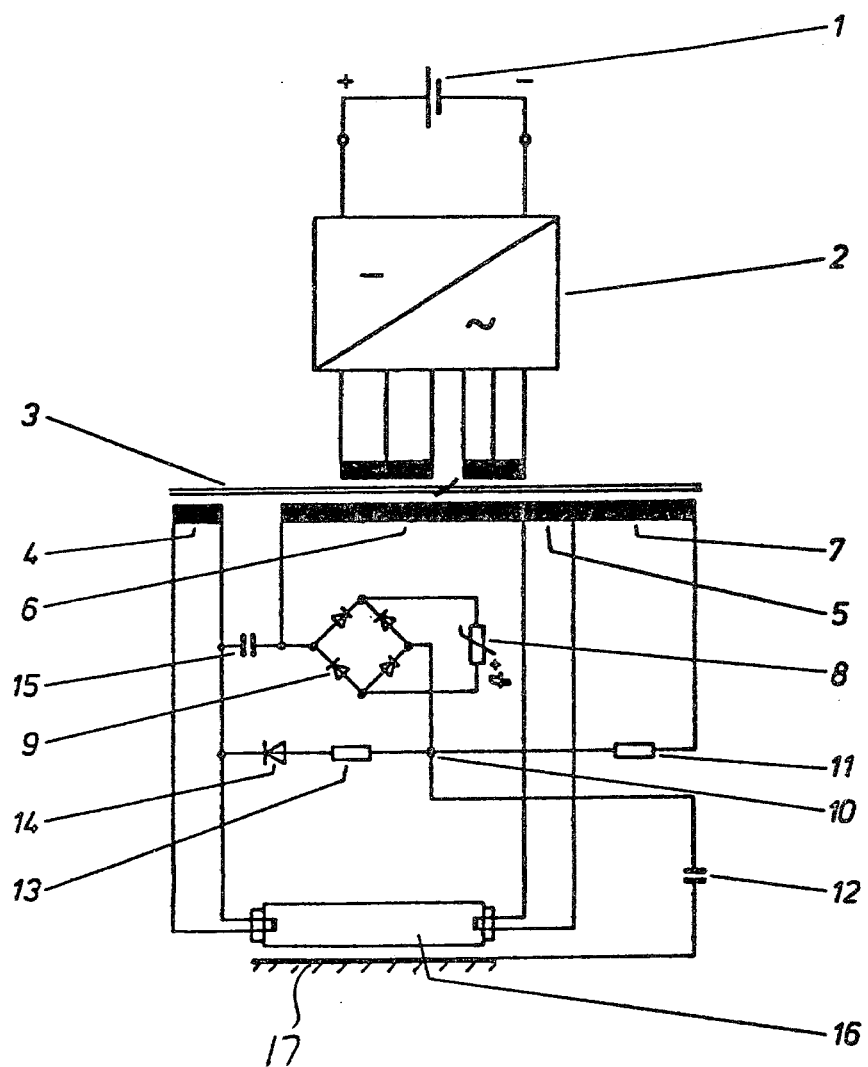

CIRCUIT FOR TRANSISTOR BALLASTS FOR THE GENTLE IGNITION OF FLUORESCENT LAMPS

The present invention relates to a transistor ballast circuit arrangement for operating commercial flourescent lamps from a D.C. source. In such known circuit arrangements, the operating frequency is about 20 kHz, a stray field transformer serving as transformer. The transformer includes the operating, filament heating and ignition windings for the fluorescent lamp.

In such known circuits, the preheating for the filament required for proper ignition of the fluorescent lamp is usually not achieved because the auxiliary ignition voltage present at the same time is effective immediately as capacitive ignition aid. Thus, the required temperature rise for the heater coils is not waited for before ignition occurs. Considering operation at low ambient temperatures, such as $-15°$ to $-20°$ C., and operation also at a reduced battery supply voltage, the ignition conditions become even worse because the transformer must then be adapted for producing a higher operating voltage. This causes the initiation of the lamp ignition at normal ambient temperatures to occur even earlier. Therefore, any lamp ignition will then have a very harmful effect.

According to the invention, the solution to the foregoing problem includes an arrangement of the type in that a ballast tube, or resistor, is disposed in the D.C. circuit of a rectifier. The A.C. terminals of the rectifier are connected to the start of the operating voltage winding on the one hand and, via a resistor, to the end of the auxiliary ignition voltage winding on the other. The junction point of the voltage divider of the rectifier and resistor appropriately charges, particularly at low ambient temperatures, via another resistor and a diode, a capacitor in the lamp circuit. In addition, a capacitor or resistor serving as capacitive ignition aid is connected to the said junction point.

On embodiment example of the invention is explained by way of the annexed drawing having a single FIGURE.

A D.C. source 1, which can be a battery or other supply, supplies a transistor oscillator 2 which oscillates at about 20 kHz and provides an A.C. output voltage to a stray field transformer 3. Located on the secondary side of transformer 3 are the two windings 4 and 5, for supplying heating current to the filaments of a fluorescent lamp 16, an operating voltage winding 6 and an auxiliary ignition winding 7 for supplying a staring voltage.

Upon energizing the D.C. to A.C. inverter, the oscillator 2, the heater coils of the lamp are preheated in the first instance so that the two lamp electrodes are sufficiently preheated after about one second. As explained above, in some cases the starting voltage is applied before this time has elapsed, thereby possibly harming the filament.

A ballast tube, or resistor, 8 is connected to the operating voltage winding 6 via a full wave bridge rectifier 9 on the one hand and to one end of the auxiliary ignition winding 7 via a resistor 11 on the other. As seen, the ballast 8 is connected across a first pair of opposite terminals of the bridge, the D.C. output terminals, and the end of winding 6 and the resistor 11 connected across the second pair of opposite A.C. input termnals. The ballast 8 has a normally high resistance which decreases after heating. The rectifier 9 and resistor 11 effectively form a voltage divider with the impedance of the rectifier changing as the resistance of the ballast 8 changes.

The circuit is such that the voltage potential between the lamp and the lighting fixture ground 17, connected via a capacitor 12, is low at the central junction point 10 in the first moment the ballast circuit is energized. The ballast 8 is heated gradually due to the presence of the resistor 11, which may also be a capacitor, which limits the current to the rectifier 9. After about a second, the junction point 10 shifts potentialwise to the voltage at the end of the auxiliary ignition winding. This causes the capacitive ignition aid, via a capacitor 12, to become suddenly highly effective so that, at normal temperature, the lamp is now ready for ignition. Thus, the ballast resistor 8 and rectifier 9 effectively cause a delay in the application of the auxiliary starting voltage.

A resistor 13 and a diode 14 connected to the junction point 10 charges a capacitor 15 which is used in case the lamp 16 did not ignite in the normal way. This can occur particularly at low ambient temperatures. If the lamp fails to normally ignite, the voltage on the capacitor 15 which is in series with the lamp operating circuit, increases until finally the voltage at the lamp, or the voltage from electrode to electrode, becomes high enough that ignition takes place.

The circuit arrangement is advantageous in that no harm to the lamp occurs when starting it. Further, reliable operation at low temperature is assured, even at a reduced supply voltage, by means of the delayed charging of the capacitor 15.

The circuit of the invention accomplishes delayed ignition of the fluorescent lamp without the need of a mechanical or electronic switch. Therefore, it is possible to achieve a simpler and cheaper production of this apparatus in addition to great operating reliability at good electrical efficiency.

Excellent results have been obtained using the foregoing circuit. A test lamp switched on and off in excess of 500,000 showed no blackening at the areas of the electrodes, where such blackening would normally occur in a lamp with improper ignition characteristics.

What is claimed is:

1. A ballast circuit for a pre-heat type fluorescent lamp comprising a voltage source means including a transformer,
    said transformer having a primary winding, a secondary operating winding, an auxiliary ignition winding and at least one filament heating winding,
    rectifier means,
    ballast resistor means connected to the D.C. output terminals of said rectifier means, one end of said operating winding connected to an A.C. input terminal of said rectifier means,
    impedance means connecting one end of said ignition winding to the other A.C. input terminal of the rectifier means,
    and capacitor means connected from said other A.C. input terminal to said lamp to provide the voltage from the ignition winding thereto after a predetermined time as determined by said ballast resistor means.

2. A ballast circuit as in claim 1 wherein said impedance means comprises a resistor.

3. A ballast circuit as in claim 1 wherein said impedance means comprises a capacitor.

4. A ballast circuit as in claim 1 wherein said capacitor means supplies the ignition winding voltage to a ground plane located adjacent said lamp.

5. A ballast circuit as in claim 1 further comprising a second capacitor in series with said secondary operating winding and the lamp, and means for charging said second capacitor means.

6. A ballast circuit as in claim 5 wherein said charging means comprises a second impedance means and a diode connected between said other A.C. input terminal of said rectifier means and said second capacitor means.

7. A ballast circuit as in claim 6 wherein said second impedance means comprises a resistor.

* * * * *